United States Patent [19]

Samulowitz

[11] 3,979,668

[45] Sept. 7, 1976

[54] DEVICE FOR TESTING ANY LEAKAGE OF VACUUM-TIGHT GLASS SEALS

[75] Inventor: Helmut Samulowitz, Verlautenheide, Germany

[73] Assignee: U.S. Philips Corporation, New York, N.Y.

[22] Filed: July 17, 1974

[21] Appl. No.: 489,372

[30] Foreign Application Priority Data

July 27, 1973 Germany............................ 2338192

[52] U.S. Cl. ............................... 324/71 R; 324/33; 324/71 EB
[51] Int. Cl.² ........................................ G01N 27/70
[58] Field of Search ............... 324/33, 71 R, 71 EB

[56] References Cited

UNITED STATES PATENTS

| | | | |
|---|---|---|---|
| 2,696,584 | 12/1954 | Lion et al. | 324/33 |
| 3,096,478 | 7/1963 | Brown | 324/33 |
| 3,639,831 | 2/1972 | Cushman | 324/33 |

*Primary Examiner*—John K. Corbin
*Assistant Examiner*—Wm. H. Punter
*Attorney, Agent, or Firm*—Frank R. Trifari

[57] ABSTRACT

A device for testing leakage of vacuum-tight glass seals by means of high voltage electrodes arranged on either side of the glass seal. At least one of the electrodes consists of a hot gas jet from a burner which is connected at one end to the high voltage source.

1 Claim, 3 Drawing Figures

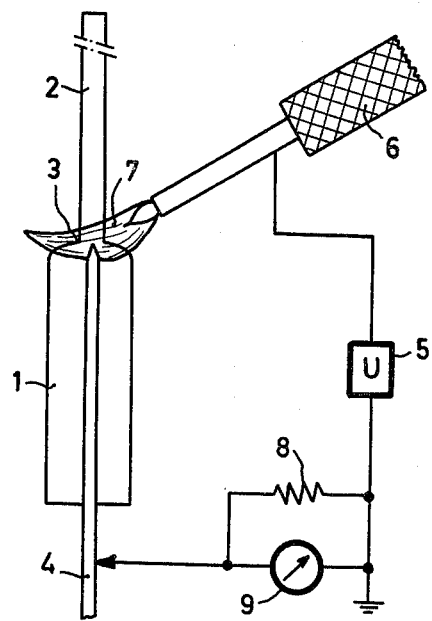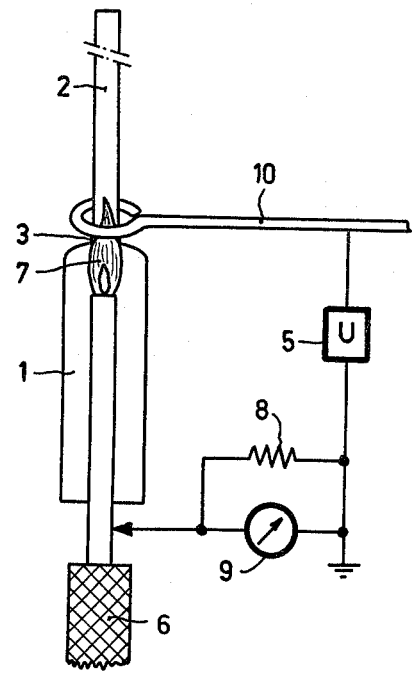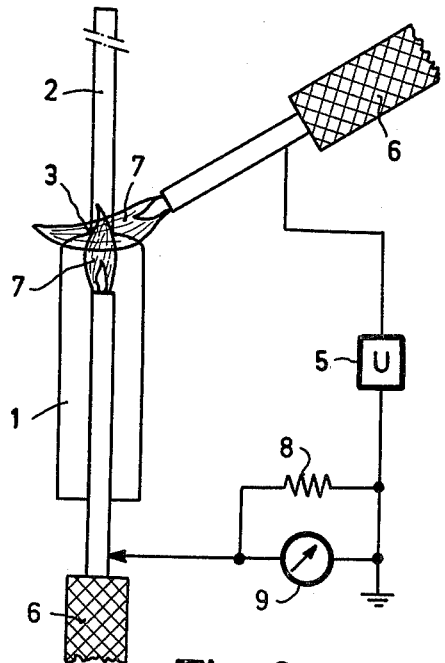

DEVICE FOR TESTING ANY LEAKAGE OF VACUUM-TIGHT GLASS SEALS

The invention relates to a device for testing any leakage of vacuum-tight glass seals by means of electrodes which are connected to a high voltage source and are arranged on either side of the glass seal, which electrodes produce an electric breakdown through the glass seal in the case of leakage.

Such devices operate at voltages between 20 and 30 kV; either a pulsatory voltage of, for example, 50 Hz or a true direct voltage may be used. In the case of leakage of a glass seal, that is to say when air is included, a mixed dielectric is formed so that when a high voltage is applied a high field strength occurs at that area which results in an electric breakdown which can be established by means of a measuring device arranged in the high voltage circuit.

In the prior art devices of this type, in particular for testing the leakage of seals between an open lamp or tube envelope and an exhaust tube a fixed rod electrode is arranged in the open envelope, while either two rod electrodes or an annular electrode are used as outer electrodes. When two rod-shaped outer electrodes are used, however, the result of the measurement depends considerably upon the position of the electrodes with respect to the place of leakage. An annular outer electrode on the contrary cannot be used in those cases in which the glass envelope to be tested which is in a horizontal position is to be moved. In that case an annular electrode should each time be moved over the envelope and be removed again before the horizontal movement can be carried out. This requires a comparatively expensive mechanism.

It is the object of the invention to provide a device which operates without obstructive electrodes and nevertheless provides a leakage indication which is independent of the position of the place of leakage.

According to the invention this object is achieved in a device of the type described in the preamble in that at least one of the high voltage electrodes is a hot gas jet the burner of which is connected at one end to the high voltage source.

The hot gas jet provides a perfect contact throughout the surface of the glass seal to be tested and hence an indication which is independent of the position of any leakage place. The burner itself may be arranged beside the processing machine so that it is not obstructive in the further processing of the article to be tested. When a leakage place is present, a breakdown occurs between the conductive hot gas jet and the counter electrode. This condition becomes noticeable by an increased current consumption in the high voltage circuit and can be indicated there by means of a measuring device.

The burner which has an insulated construction and is connected at one end to the high voltage source can be operated, for example, with natural gas or manufactured gas or another combustible gas.

As already described, the device according to the invention is preferably suitable for testing any leakage of seals between an open lamp or tube envelope and an exhaust tube. When a fixed rod electrode is arranged in the open envelope, as is the case in a known device of this type, according to a preferred embodiment of the invention the outer electrode may be a hot gas jet. This embodiment is useful in particular when simultaneously with the leakage test a control air flow is blown through the envelope so as to find out whether the free crosssection of the exhaust tube during sealing the envelope and the exhaust tube has been maintained.

However, when the outer electrode is constructed as a fixed annular electrode which is slid on the exhaust tube, according to the invention the inner electrode is a hot gas jet flowing around the seal on the inside.

According to a further embodiment of the invention both the outer electrode and the inner electrode in the said device may be hot gas jets.

The invention will now be described in greater detail with reference to an embodiment shown in the drawing.

FIG. 1 shows diagrammatically one embodiment of apparatus for testing leakage according to the invention;

FIG. 2 shows another embodiment of the invention utilizing an annular electrode; and FIG. 3, shows still another embodiment using two flames.

In FIG. 1 numeral 1 denotes a lamp or tube envelope of glass to which an exhaust tube 2 has been sealed. The glass seal 3 between the envelope 1 and the exhaust tube 2 is to be subjected to a leakage test. For that purpose a fixed rod electrode 4 is arranged in the open envelope 1 and is connected to a high voltage source 5. The other side of the high voltage source 5 is connected to a burner 6 which is constructed in an insulated manner and which is supplied, for example, with natural gas or manufactured gas. The gas jet 7 flowing from the said burner 6 constitutes the counter electrode for the fixed rod electrode 4. The hot gas jet 7 flows entirely around the glass seal 3 between the envelope 1 and the exhaust tube 2. In the case of a leakage in the glass seal 3 a breakdown occurs between the ionized hot gas jet 7 and the electrode 4 which results in a voltage drop at a resistor 8 in the current circuit of the high voltage source, which voltage drop can be indicated by a voltmeter 9 which is connected parallel to the resistor 8.

As seen in FIGS. 2 and 3 the fixed rod electrode 4 may be replaced by a burner with a hot gas jet 7. In this case the outer electrode may be an annular electrode 10 or the like, if desired. As shown in FIG. 3 both electrodes may be hot gas jets 7.

What is claimed is:

1. A device for testing any leakage of vacuum-tight glass seals by means of electrodes which are connected to a high voltage source, said electrodes being arranged on either side of the glass seal, which electrodes produce an electric breakdown through the glass seal in the case of leakage wherein at least one of the high voltage electrodes is a burner and a jet of burning gas from said burner, said burner being connected to said high voltage source wherein said seal is between an open lamp envelope and an exhaust tube and wherein an outer electrode and an inner electrode are burning jets of gas.

* * * * *